(12) United States Patent
Rudmann et al.

(10) Patent No.: US 8,962,079 B2
(45) Date of Patent: Feb. 24, 2015

(54) MANUFACTURING OPTICAL ELEMENTS

(75) Inventors: Hartmut Rudmann, Jona (CH); Susanne Westenhofer, Wettswil (CH); Stephan Heimgartner, Lucerne (CH); Diane Morgan, Zurich (CH); Markus Rossi, Jona (CH)

(73) Assignee: Heptagon Micro Optics Pte. Ltd., Singapore (SG)

( * ) Notice: Subject to any disclaimer, the term of this patent is extended or adjusted under 35 U.S.C. 154(b) by 770 days.

(21) Appl. No.: 12/809,408

(22) PCT Filed: Dec. 16, 2008

(86) PCT No.: PCT/CH2008/000535
§ 371 (c)(1),
(2), (4) Date: Oct. 19, 2010

(87) PCT Pub. No.: WO2009/076791
PCT Pub. Date: Jun. 25, 2009

(65) Prior Publication Data
US 2011/0024030 A1 Feb. 3, 2011

Related U.S. Application Data

(60) Provisional application No. 61/014,813, filed on Dec. 19, 2007.

(51) Int. Cl.
*B05D 5/00* (2006.01)
*B29D 11/00* (2006.01)
(Continued)

(52) U.S. Cl.
CPC ........ *B29D 11/00365* (2013.01); *B29C 43/021* (2013.01); *B29L 2011/0016* (2013.01)
USPC .............. 427/256; 264/1.7; 264/2.2; 264/2.5; 264/319; 264/328.1

(58) Field of Classification Search
CPC ................................ B05D 3/12; B29C 43/021
USPC .......... 425/3, DIG. 33; 427/256; 264/1.7, 2.2, 264/2.5, 319, 328.1
See application file for complete search history.

(56) References Cited

U.S. PATENT DOCUMENTS 5,368,793 A * 11/1994 Lau ................................. 264/39
6,610,166 B1   8/2003 Harden et al.
(Continued)

FOREIGN PATENT DOCUMENTS

CN         1503039       6/2004
JP       2000-301550    10/2000
(Continued)

*Primary Examiner* — Alexander Weddle
*Assistant Examiner* — James M Mellott
(74) *Attorney, Agent, or Firm* — Rankin, Hill & Clark LLP

(57) ABSTRACT

A method includes the steps of: providing a substrate; providing a tool having, on a replication side, a plurality of replication sections, each replication section defining a surface structure of one of an optical element(s), the tool further including at least one contact spacer portion, the contact spacer portion protruding, on the replication side, further than an outermost feature of the replication sections; aligning the tool with a feature of the substrate and bringing the tool and a first side of the substrate together, with replication material between the tool and the substrate, the contact spacer portion contacting the first side of the substrate, and thereby causing the spacer portion to adhere to the first side of the substrate, thereby producing a substrate-tool-assembly; dislocating the substrate-tool-assembly to a hardening station; causing the replication material to harden at the hardening station; and separating the tool from the substrate with the hardened replication material adhering to the substrate.

21 Claims, 4 Drawing Sheets

(51) Int. Cl.
   *B28B 3/00*   (2006.01)
   *B29C 43/02*   (2006.01)
   *B29L 11/00*   (2006.01)

(56) References Cited

U.S. PATENT DOCUMENTS

| | | | |
|---|---|---|---|
| 7,142,366 | B2 | 11/2006 | Okada et al. |
| 7,457,490 | B2 | 11/2008 | Rudmann et al. |
| 2001/0032702 | A1* | 10/2001 | Feldman et al. ............... 156/297 |
| 2002/0141062 | A1* | 10/2002 | Christoffersen et al. ..... 359/566 |
| 2005/0116370 | A1 | 6/2005 | Ogino et al. |
| 2006/0113701 | A1* | 6/2006 | Rudmann et al. ............. 264/219 |
| 2006/0141743 | A1* | 6/2006 | Best et al. ..................... 438/455 |
| 2007/0134362 | A1* | 6/2007 | Heidari ......................... 425/385 |
| 2008/0041816 | A1* | 2/2008 | Choo ............................. 216/24 |

FOREIGN PATENT DOCUMENTS

| | | |
|---|---|---|
| JP | 2001-519601 | 10/2001 |
| JP | 2002-372603 | 12/2002 |
| JP | 2003-071860 | 3/2003 |
| JP | 2004-258071 | 9/2004 |
| JP | 2005-135957 | 5/2005 |
| JP | 2005-153091 | 6/2005 |
| JP | 2005-227679 | 8/2005 |
| JP | 2007-524243 | 8/2007 |
| WO | 2004/068198 | 8/2004 |
| WO | 2007/060592 | 5/2007 |
| WO | 2007/107026 | 9/2007 |

* cited by examiner

MANUFACTURING OPTICAL ELEMENTS

BACKGROUND OF THE INVENTION

1. Field of the Invention

The invention is in the field of manufacturing a plurality of optical elements, for example refractive optical elements or diffractive micro-optical elements, on a waver scale by means of a replication process that includes embossing or moulding steps. More concretely, it deals with a method of replicating an optical element.

2. Description of Related Art

Replicated optical elements include transparent diffractive and/or refractive optical elements for influencing an optical beam in any pre-defined manner, refractive elements such as lenses, potentially at least partially reflecting elements etc.

When optical elements are produced by replication, there is often a basic configuration involving a substrate and a replication tool, and replication material being placed in contact with the substrate and/or the replication tool. The replication tool comprises a replication structure being the negative of a surface structure of the element(s) to be replicated. In the course of a replication process, the replication material is hardened, and thereafter the replication tool is removed, the replication material remaining in contact with the substrate.

Of special interest are the wafer-scale fabrication processes, where an array of optical elements is fabricated on a large-scale, for example disk-like ("wafer-") structure, which subsequent to replication is separated ("diced") into the individual elements or stacked on other wafer-like elements and after stacking separated into the individual elements, as for example described in WO 2005/083 789. 'Wafer scale' refers to the size of disk like or plate like substrates of sizes comparable to semiconductor wafers, such as disks having diameters between 2 in and 12 in.

In the following text, the substrate is sometimes referred to as "wafer". This is not to be interpreted as being limiting in terms of size or shape of the substrate, rather, the term denotes any substrate suitable for an array of optical elements that are, at some stage subsequent to the replication process, diced into a plurality of components.

Often, optical elements manufactured by replication process include replicated structures on both sides of a wafer, the two sides together, for example, constituting a lens singlet. In such a process, the structures on the second side must be aligned with the replicated structures on the first side. This is typically done in a so-called mask aligner where the tool is aligned to some structure on the wafer. With the tool held in place by some mechanical features, the replication material is then hardened, for example by being exposed to some activation energy, for example in the form of UV radiation. Since the hardening process is usually comparably time consuming, for mass production a large number of mask aligners would have to be used, so that several replication processes can be carried out in parallel. Also, as for the alignment step, mask aligners have to be operated manually, a lot of personnel or a lot of coordination is required.

BRIEF DESCRIPTION OF THE INVENTION

It is therefore an object of the invention to create a method of manufacturing a plurality of optical elements overcoming drawbacks of prior art methods. It is a further object of the invention to create a method of manufacturing a plurality of optical elements, which method is fast and suitable of being used for mass production of the optical elements. Yet another object is to provide a method and a facility for mass replicating elements.

These and other objects are achieved by the method that includes the steps of:

providing a substrate;

providing a tool comprising, on a replication side, a plurality of replication sections, each replication section defining a surface structure of one of the optical elements, the tool further comprising at least one contact spacer portion, the contact spacer portion protruding, on the replication side, further than an outermost feature of the replication sections;

aligning the tool with a feature of the substrate and bringing the tool and a first side of the substrate together, with replication material between the tool and the substrate, the contact spacer portion contacting the first side of the substrate, and thereby causing the spacer portion to adhere to the first side of the substrate, thereby producing a substrate-tool-assembly;

dislocating the substrate-tool-assembly to a hardening station;

causing the replication material to harden at the hardening station; and separating the tool from the substrate with the hardened replication material adhering to the substrate.

This approach, thus, may include to lock, after alignment of the tool and the substrate with respect to each other, by means of a feature protruding from the replication surface and with a flat top essentially parallel to the substrate surface, namely the contact spacer(s). This locking makes a transfer of the substrate tool assembly from the alignment station to another station possible without prior energy input. Such prior energy input according to state-of-the-art solutions is both, limiting the construction degrees of freedom of the alignment station (and may necessitate comparably sophisticated alignment stations) and time consuming. The transfer without prior energy input is possible even though the replication material is liquid or highly viscous or plastically deformable with little force resistance and does, prior to hardening, not provide any dimensional stiffness. Due to the approach according to the invention, however, the contact spacer portions act like a suction base, thus providing the necessary mechanical stability. What's more, the contact spacers also contribute to the definition of the z-dimension of the elements replicated.

The substrate may be a so-called "wafer-scale" substrate or "wafer" of the kind mentioned herein before, or other base element, with an additional structure added to it, for example with a hardened replication material structure adhering to it, defining a surface of the plurality of optical elements, with some lithographically added or removed features (such as apertures etc.) or with some other structure. The substrate may comprise any material or material combination. The term substrate herein may denote, depending on the context, both, a simple plate of glass or other suitable material (also called "base element"), or such base element with structures provided on and/or in it, for example a glass plate with a hardened replica on one of its sides.

At some stage, subsequent to the above-mentioned method steps for aligned replication, the substrate with the replica(s) adhering to it is divided (diced) into the individual optical elements. Prior to dicing, the method may optionally include the step of assembling the substrate with further substrates carrying optical elements, with spacer substrates defining a space between different substrates and/or with substrates carrying a plurality of other elements, such as a CMOS or CCD wafer if the final product is a camera, a wafer with an array of light sources if the final product is a collimated light source, etc.

The optical elements may be any elements influencing light that is irradiating them including but not restricted to lenses/collimators, pattern generators, deflectors, mirrors, beam splitters, elements for decomposing the radiation into its spectral composition, etc., and combinations thereof. In this text, both, a replicated structure on one side of a substrate, and an ensemble of two aligned replicated optical elements on two sides of a substrate are called "optical element". "Optical" elements in this text include elements that are capable of influencing electromagnetic radiation not only in the visible part of the spectrum. Especially, optical elements include elements for influencing visible light, Infrared radiation, and potentially also UV radiation.

The tool (or "replication tool") may comprise a first, hard material forming a rigid back plate and a second, softer material portion (replication portion) that forms both, the contact spacer portion(s) and the replication sections. More in general, the contact spacer portion(s) may be of the same material as the portion of the tool that forms the replication sections, and may merely be structural features of the tool (not added elements). As an alternative, the contact spacer portions may comprise an additional material, for example a coating of a soft and/or adhesive material on an outermost surface.

The second material portion—or at least a material of an outermost surface portion of the contact spacer portions—is made of a material with a comparably low stiffness, the material being deformable on a small scale to adapt its shape to surface structures of the object it rests against, such as sub-micrometer-scale surface roughnesses. Said material may in addition have a comparably low surface energy to make such adaptation energetically attractive. By this, the contact spacer adheres to the substrate surface and in this way locks the relative position of the tool and the substrate. It is only with a force that is either substantially stronger than the usual shear forces occurring during a transfer from one station to another station or with a force with a strong component in the z-direction that this locking can be released.

As an alternative to the—preferred—low stiffness material like PDMS, the contact spacers may also comprise an adhesive, for example an adhesive layer. The approach to use a low stiffness material for the entire replication portion of the tool—that also includes the replication sections defining surface structures of the elements to be replicated—however provides the advantage of being comparably advantageous regarding its manufacturing, as no separate step for adding the contact spacers or a coating thereof is required. The entire replication portion may be manufactured in a single shape by replicating (moulding, embossing etc.) from a master or submaster that also includes the contact spacer portion(s).

The contact spacer portions are operable to rest against the substrate during replication, with no material between the contact spacer portions and the substrate. The contact spacer portions may be contiguous or may comprise a plurality of discrete portions around the periphery or distributed over a large portion of the periphery and/or an interior of the replication surface. In other words, the contact spacer portion(s) may—together with optional floating spacer portions as described in WO 2007/107026—be in any configuration that allows the replication tool to rest against the substrate. For example, the distribution of the contact spacer portion(s) is such that contact spacer portion(s) are on both sides of every in-plane line through the center of mass of the tool.

According to a preferred embodiment, the contact spacer portions and the floating spacer portions (if any) are arranged and configured such that if the tool lies on the substrate, the thickness (the z-dimension, i.e. the dimension perpendicular to the substrate and tool plane) is defined by the spacer portions, as taught in WO 2004/068 198 and WO 2007/107026, both incorporated herein by reference.

The replication material may in principle be any suitable material that is liquid or viscous or plastically deformable in a first state and may be hardened during a manufacturing cycle. Depending on the nature of the optical element to be manufactured, the replication material further has to exhibit a certain transparency after hardening, for example if the optical element is a lens. A preferred class of materials for the replication material is UV curable epoxy. The hardening step, which is done while the replication tool is still in place—may then be an UV curing step. UV light curing is a comparably fast process that allows for a good control of the hardening process. The skilled person will know other materials and other hardening processes.

In order to align the tool and the substrate, both (or, if for example the tool has a well-defined position in the alignment station, only one of them) may be provided with appropriate markings. Such markings on the substrate may be present already in the base element (original substrate, for example wafer), for example to be a cross marking scribed into the glass base element surface.

According to a special aspect of the invention, however, the markings for alignment are added by replication. This is especially advantageous for the case of double-sided replication, where both sides of an at least partially transparent substrate are to be provided with replicated structures that have to be aligned to each other. According to this special aspect of the invention, a method of manufacturing a plurality of optical elements thus comprises the steps of:

Providing an at least partially transparent base element;

Providing a first replication tool, the first replication tool comprising a plurality of replication sections, each replication section defining a surface structure of one of the optical elements, the first replication tool further comprising an alignment mark replication section;

Moving the first replication tool and the base element against each other with replication material between them until the replication material is in contact with both, a second surface of the base element and the replication tool;

Hardening the replication material to yield a replicated structure adhering to the second surface of the base element, the replicated structure including a plurality of optical elements and at least one alignment mark, the alignment mark being a replica of the alignment mark replication section;

Removing the first replication tool;

Providing a second replication tool and aligning a feature of the second replication tool with the alignment mark with further replication material between the second replication tool and a first surface of the base element;

Moving the second replication tool and the base element against each other with the further replication material between them until the replication material is in contact with both, the surface of the base element and the replication tool;

Hardening the further replication material to yield a further replicated structure adhering to the first surface of the base element; and Removing the second replication tool.

This special aspect of the invention features the substantial advantage that in the first replication step, the relative position of the first replication tool and the base element is uncritical, and nevertheless a very precise alignment in the second replication step is possible.

The first replication tool in this preferably comprises two alignment mark replication sections arranged at different peripheral positions, such as antipodal positions. The two resulting alignment marks are then aligned to two corresponding features of the second replication tool.

This method is also useful in other configurations than the one according to the main aspect of the invention, in which the substrate-tool-assembly is removed from the alignment station prior to hardening. Preferably, however, at least the second tool and, for example, also the first tool are provided with contact spacers functioning as locking means as described above.

Alignment marks—whether replicated or otherwise provided—may for example be cross shaped or have another shape allowing a point on a surface to be precisely defined, for example a shape having two edges meeting in a corner. For the case of automatized alignment, the alignment marks may have any characteristic shape allowing both, recognition and precise surveying of the mark.

For the alignment station, a mask aligner available on the market may be used. As an alternative, other devices with means for precisely aligning two objects based on optical information may be used, for example other devices that include a microscope. Also automatical aligners that may be based on image processing techniques, laser tracking or even on non-optical markers such as magnetical markers etc. may be feasible.

The alignment station in any case may be equipped to carry out an alignment and contacting step that may include the sub-steps of:
making a surface of the substrate and a surface of the tool parallel;
aligning features on the substrate and the tool with each other, so that their position in the plane defined by the surfaces of the substrate and the tool are in a well-defined relation to each other and, for example, correspond to each other; and
subsequently bringing the substrate and the tool together so that outermost features of the tool are in contact with the substrate.

The surfaces of the substrate and of the tool made parallel in the first sub-step need not be contiguous flat planes but may be defined by different portions, such as the flat outermost surfaces of the contact spacer(s). As an alternative to the outermost flat surfaces of the contact spacers, a rigid back plate of the tool or other reference plane of the tool may be used for the sub-step of parallelizing.

The step of dislocating the substrate-tool-assembly to a hardening station—in accordance with the main aspect of the invention—includes a dislocation of the assembly from one station to another. It is thus preferably not only a slight shifting, for example by a certain shifting in z direction—but the displacement includes withdrawing the assembly from a range of the alignment station and introducing it into the hardening station, thus into a range of an illumination device (the illumination device placed so that it does not reach the alignment station). For example, the dislocating step may include moving the assembly along the x-y-plane by a distance at least corresponding to a diameter of the assembly.

BRIEF DESCRIPTION OF THE DRAWINGS

The subject matter of the invention will be explained in more detail in the following text with reference to preferred exemplary embodiments, which are illustrated in the attached drawings. The drawings schematically show.

Identical or analogous parts are provided with the same reference symbols in the figures.

DETAILED DESCRIPTION OF PREFERRED EMBODIMENTS

Figure 1:
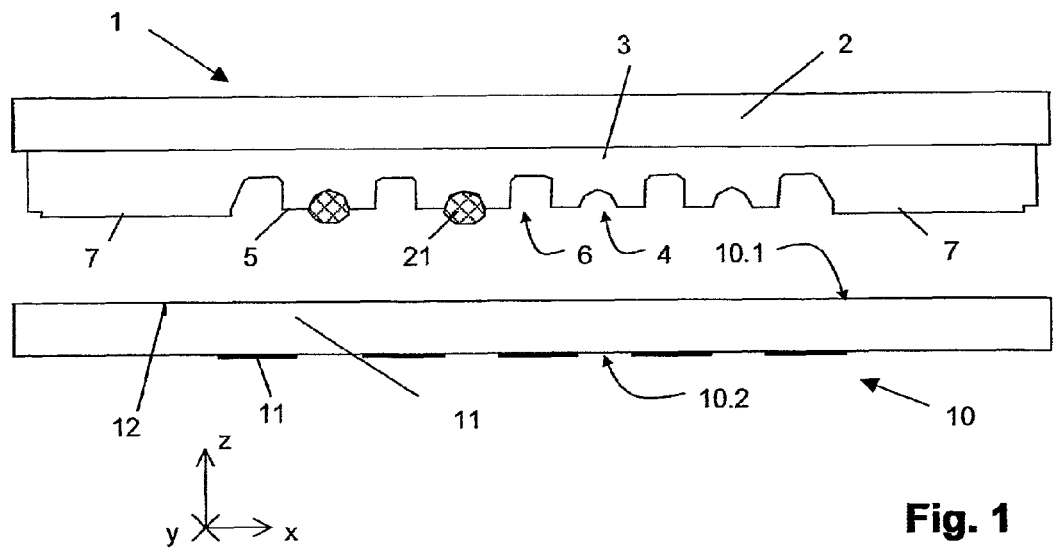
FIG. 1: a cross section through a tool and a substrate.

FIG. 1 schematically shows a cross section through a tool 1 and a substrate 10. The tool 1 in the shown embodiment comprises a rigid backplate 2 of a first material, for example glass, and a replication portion 3 of a second, softer material, for example PDMS. The replication portion forms a replication surface comprising a plurality of replication sections 4, the surface of each of which is a (negative) copy of a surface shape an optical element to be manufactured. In the figures, the replication sections are illustrated to be concave and thus to define a convex optical element surface, for example of a refractive lens. The teaching of this document, however, does not depend on the shape of the optical elements to be replicated and pertains to all possible optical element shapes, including concave shapes, and micro-structured shapes of diffractive elements.

In FIG. 1, also a Cartesian coordinate system is illustrated, the x-y-plane being defined by the flat sides of the replication tool and of the substrate, the z-direction being the direction perpendicular thereto. This definition of the coordinate system is used throughout this description and for all figures. For example, the z-dimension of a replicated structure always denotes the thickness of the replicated structure measured perpendicularly to the surface to which it adheres.

In the configuration illustrated in FIG. 1, the replication surface further comprises floating spacer portions 5 that surround the replication sections and that are destined to rest against a thin film of replication material during the replication process. Concerning the (optional) floating spacer portions and their function, the reader is referred to the document WO 2007/107026, the teaching of which is incorporated herein by reference.

Moreover, the replication surface comprises spill cavities 6 for accepting surplus amounts of replication material if the amount of replication material is not exactly defined.

In addition, the replication surface comprises contact spacer portions 7, that are illustrated to be arranged peripherally. The contact spacer portions are the structures of the replication tool that protrude the furthest into the z direction (a distinction between the z direction and the minus z direction is not made here). The contact spacer portions are essentially flat and, thus, are operable to rest against the substrate during replication, with no material between the contact spacer portions and the substrate. The contact spacer portions may, for example, form a ring around the periphery of the replication surface, it may comprise a plurality of discrete portions around the periphery, or it may comprise a plurality of discrete portions distributed over a large portion of the periphery and/or an interior of the replication surface.

The substrate 10 has a first side 10.1 and a second side 10.2 and can comprise a disk-like base element 11 of any suitable material, for example of glass. The substrate further comprises a structure added to it to which the replica is to be aligned. The structure may, for example, comprise a coating 11 structured in the x-y-plane, such as a screen with apertures, as illustrated, or a structured IR filter etc. The structure may in addition, or as an alternative, comprise further features 12 like markings etc. Further, or as yet another alternative, the structure may comprise a hardened replication material structure constituting a surface of the optical elements, as illustrated in other figures described further below.

For replicating the replication surface of the tool, replication material is applied to the substrate or the tool or both, the tool and the substrate. Such application of replication material may include application of a plurality of portions of replication material, one portion for each of the replication sections, to the tool and/or the substrate. Each portion may, for example, be applied by squirting one droplet or a plurality of droplets, by a dispensing tool that may for example work in an inkjet-printer-like manner. Each portion may optionally consist of a plurality of sub-portions that get in contact with each other only during replication. Concerning the application of a plurality of portions and the advantages thereto, the reader is referred to WO 2007/107027 incorporated herein by reference.

In FIG. 1, only two replication material portions 21 are illustrated.

After application of the replication material, the substrate and the tool are aligned with respect to each other. To this end, a process similar to the one used in so-called mask aligners may be used, which mask aligners were originally designed for the alignment of an exposure mask with a semiconductor wafer. The alignment process may include aligning at least one particular feature (preferably two features are used) of the tool and/or of the substrate with at least one particular feature of the substrate or the tool, respectively, or with a reference point of the alignment device. Suitable features for this include well-defined elements of the structure itself (such as a defined corner of a structured coating or a lens peak etc.), specifically added alignment marks, or possibly also edges etc. of the base element etc. Alignment also includes, as is known in the art, precisely making parallel the tool and substrate surfaces to avoid wedge errors; such parallelization may take place prior to the x-y-alignment.

Subsequent to the alignment, the substrate and the tool are brought together, with the contact spacer portions resting against the substrate surface and defining (if present, together with the floating spacers) the z dimension and also locking the tool against x-y-movements. Thereafter, the substrate-tool-assembly is removed from the alignment station and transferred to a hardening station, as will be explained in more detail further below.

The replication portion 3 of the tool—or at least a surface of the contact spacer portions—is made of a material with a comparably low stiffness so that it can, under 'normal' conditions where for example no more pressure than the one caused by gravity forces of the tool lying on the substrate or vice versa, adapt to roughnesses on a micrometer and/or sub-micrometer scale and, thus, may form an intimate connection to the substrate surface. In addition, the replication portion of the tool or at least the surface of the contact spacer portion may have a comparably low surface energy to make such adaptation to roughnesses on a micrometer and/or sub-micrometer scale favorable.

A preferred example of such a material is polydimethylsiloxane PDMS. This material is also well suited for a replication tool forming process, as described in WO 2004/068 198, there referring to FIGS. 14-16, incorporated herein by reference.

Figure 2:
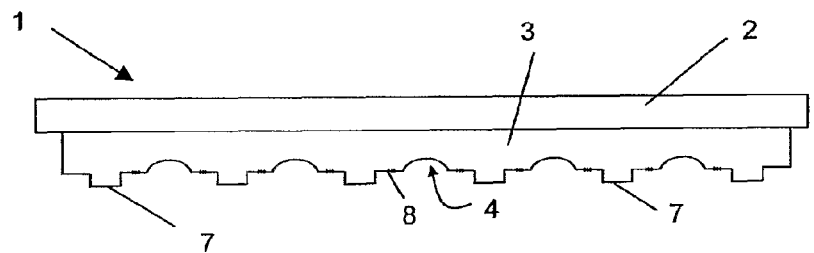
FIGS. 2 and 3: cross sections through alternative tools.
Figure 3:
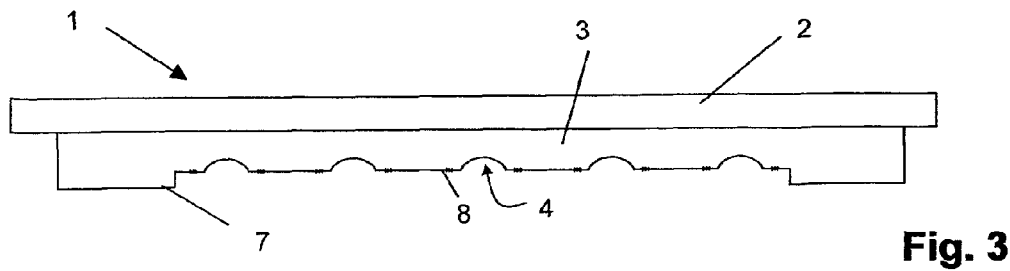

FIGS. 2 and 3 illustrate alternative design principles of tools. Properties that can be, on their own or in any combination, be added include:

a. contact spacers distributed over an essential part of the replication surface, for example between the replication sections and/or surrounding the replication sections 4 (like in FIG. 2);

b. Replication material flow confining features 8 around the replication sections, for example as described in WO 2007/107025 incorporated herein by reference (like in FIGS. 2 and 3);

c. The absence of floating spacers (like in FIGS. 2 and 3);

The embodiment of FIG. 2 is especially advantageous, since it provides an adherent contact between the replication tool and the substrate surface distributed over a large surface, like a plurality of position defining suction bases distributed over the tool surface.

Further variations can be given by different tool set-ups concerning material composition, overall tool shapes, spacer shapes, spill volume principles (including spill channels etc.), and of course, different replication section shapes defined by different functions.

All these variants may be implemented in combination with any one of the method steps described in this specification, including, if applicable, the prior replication step (thus, also the further replication tool may comprise any one or any combination of the above mentioned properties).

Figure 4:
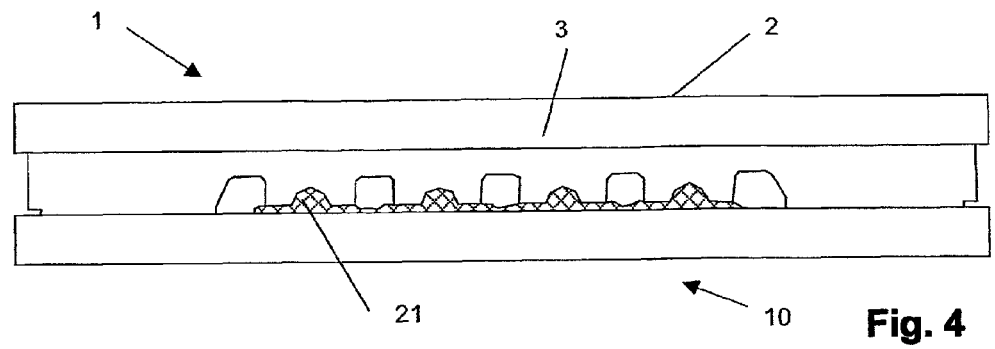
FIG. 4: a cross section through a substrate tool assembly.

Whereas the above description relies on dispensing the replication material in single portions for the replication sections, this need not be the case. FIG. 4 shows an example, where the replication material 21 is dispensed in a single blob over a substantial part of the substrate and/or replication tool surface. Combinations with single portion dispensing—for example for certain areas or for sub-units etc.—are possible.

Figure 5A:
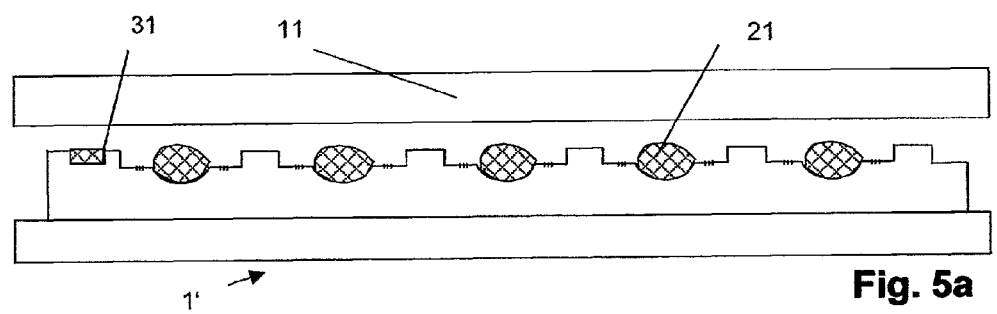
FIGS. 5a-5c method steps in a process of replicating a plurality of optical elements.
Figure 5B:
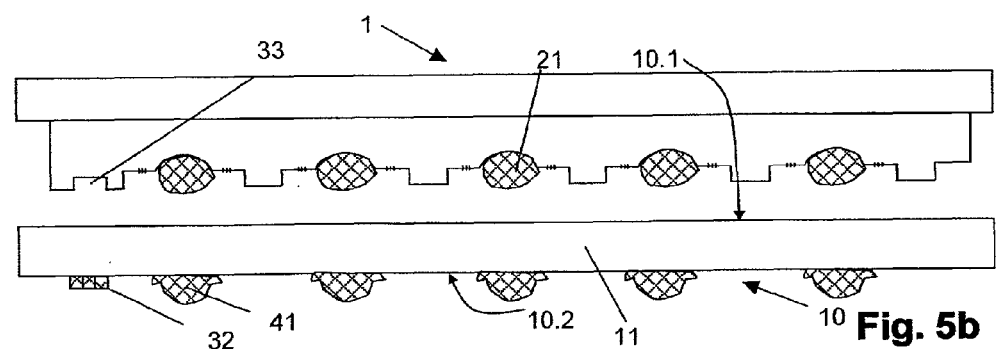
Figure 5C:
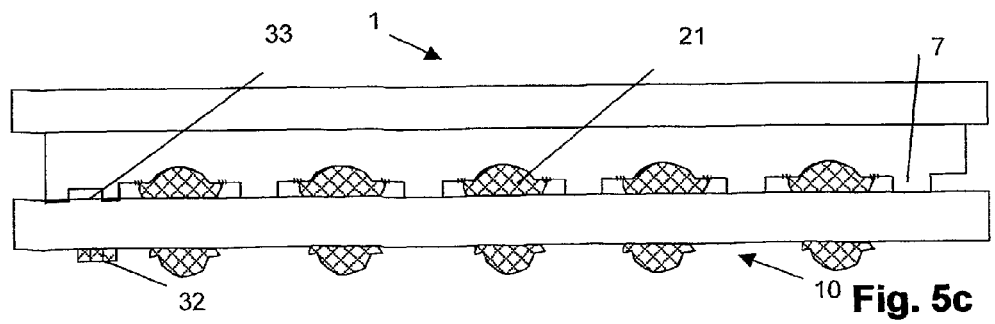

FIGS. 5a through 5c illustrate a possibility to align the tool 1 to an alignment mark added by replication. This possibility pertains to the—often encountered—case of double sided replication, where both sides of an at least partially transparent substrate 10/base element 11 are to be provided with replicated structures that together form the optical element. For this, the replicated structures on both sides have to be aligned with respect to each other.

In a process including such double sided replication, before the replication step that includes alignment, a prior replication step for adding a replicated structure to the second side 10.2 of the substrate is carried out.

To this end, a further replication tool 1' is provided that may be based on the same principle as the above-described tools 1 and that includes a plurality of replication sections and may include contact spacers as well. In addition to the replication sections, the further replication tool 1' comprises an alignment mark replication section for replicating an alignment mark 32. FIG. 5a illustrates the configuration before the further replication tool 1' and the base element 11 are brought together. Next to the replication material portions 21 in the replication sections, there is also a replication material portion 31 in the alignment mark replication section. The prior replication step may optionally include some parallelizing if wedge errors would be critical, but it usually does not necessitate any x-y-alignment.

The prior replication step includes, as is known, hardening the replication material after the further replication tool 1' and the base element 11 have been moved towards each other with the replication material between them, and subsequently removing the replication tool.

FIG. 5b shows the configuration after completion of the prior replication step and after dispensing the portions 21 of the replication material for the (second) replication step. The second side 10.2 of the substrate 10 comprises the structure 41 of hardened replication material that includes the replicated alignment mark 32 (preferably, in order to provide a well-defined x-y-alignment, two alignment marks are present; the second alignment marks of the substrate and of the tool not being shown in the figure). The tool 1 comprises an alignment feature 33 to be aligned with the alignment mark 32.

FIG. 5c shows the configuration during the replication step, where the contact spacer portion(s) 7 rest against the first surface of the substrate.

Figure 6:
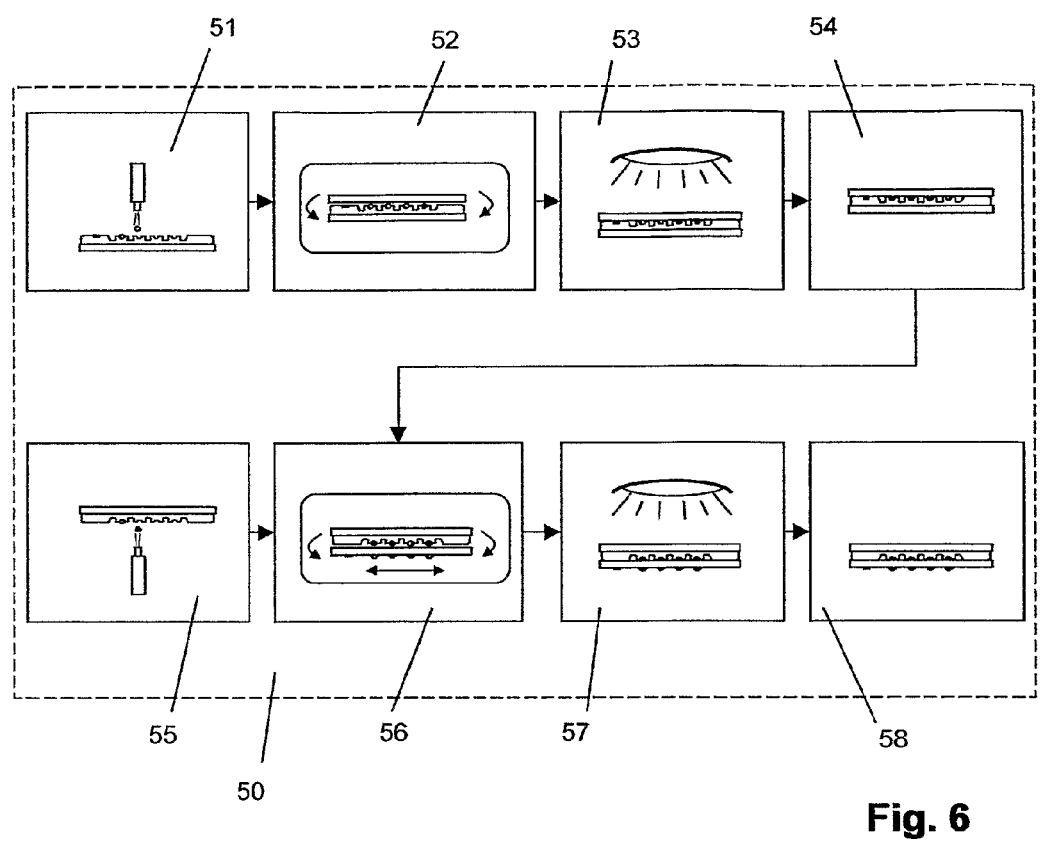
FIG. 6 a facility for manufacturing a plurality of optical elements.

FIG. 6 schematically shows a facility 50 or apparatus for producing optical elements. The first replication material dispensing station 51 here is illustrated to be for dispensing the replication material on the (further) replication tool; in individual portions; it could also be for dispensing the replication material on the base element/substrate and/or for large-scale dispensing like in FIG. 4. From the replication material dispensing station, the tool is transferred to the tool placing station 52, where it is brought in contact with the base element. In the configuration illustrated here, the (further) replication tool is of the kind having contact spacers and allows the further transferring of the replication tool base element assembly to a first hardening station 53, where the assembly is irradiated by electromagnetic radiation, for example UV radiation if the replication material is an UV curable epoxy resin. This curing process may take about 1-20 minutes. Thereafter, the assembly is optionally further transferred to a post-hardening station 54, where the assembly may rest for some time to allow the replication material hardening to be finished. Thereafter, the (further) replication tool is removed, and the resulting substrate is transferred to the alignment station 56, where it is aligned with the replication tool that was before alignment provided, in a second dispensing station 55, with dispensed replication material. From the alignment station 56, the replication tool substrate assembly is transferred to a second hardening station 57, and from there optionally to a post hardening station 58, whereafter the replication tool is removed.

This configuration may vary in several respects:

a. If the process does not concern double sided replication, the first four stations 51-54 need not be present;

b. The first and second dispensing stations 51, 55 need not be separate, rather, both dispensing processes may be carried out in a same station;

c. The tool placing station 52 may comprise the functionality of an alignment station;

d. The alignment station 56 may be used also as the tool placing station 52;

e. The first and second hardening stations 53, 57 need not be separate, rather, both hardening processes may be carried out in a same station, for example a large scale hardening station with a plurality of hardening locations, or a conveyor based hardening station where the material to be hardened is, during a pre-defined amount of time, conveyed along a light source, the different elements to be hardened crossing the hardening station according to the FIFO principle;

f. The first and second post hardening stations 54, 58, if present, may be combined, for example by a common, possibly temperature controlled storage location;

g. The post hardening station(s) need not be physically separate from the hardening station(s); rather, if the hardening station(s) has/have a high enough capacity, the post hardening stations may be constituted by the hardening station(s) with the radiation source switched off;

h. The dispensing station(s) (51,) 55 need not be physically separate from the tool placing station and/or the alignment station, respectively;

i. Under special circumstances, the tool placing station 52 and the first hardening station 53 need not be physically separate, but the tool placing station may comprise a radiation source and also constitute the first hardening station 53.

The above variants may almost arbitrarily be combined with each other, except, of course, variation a. that is only compatible with variations not necessitating there being a prior replication step. A combination of the variants b., d., e., and f. would yield a facility with only one line 55-58 that is traversed twice during double sided replication.

Figure 7:
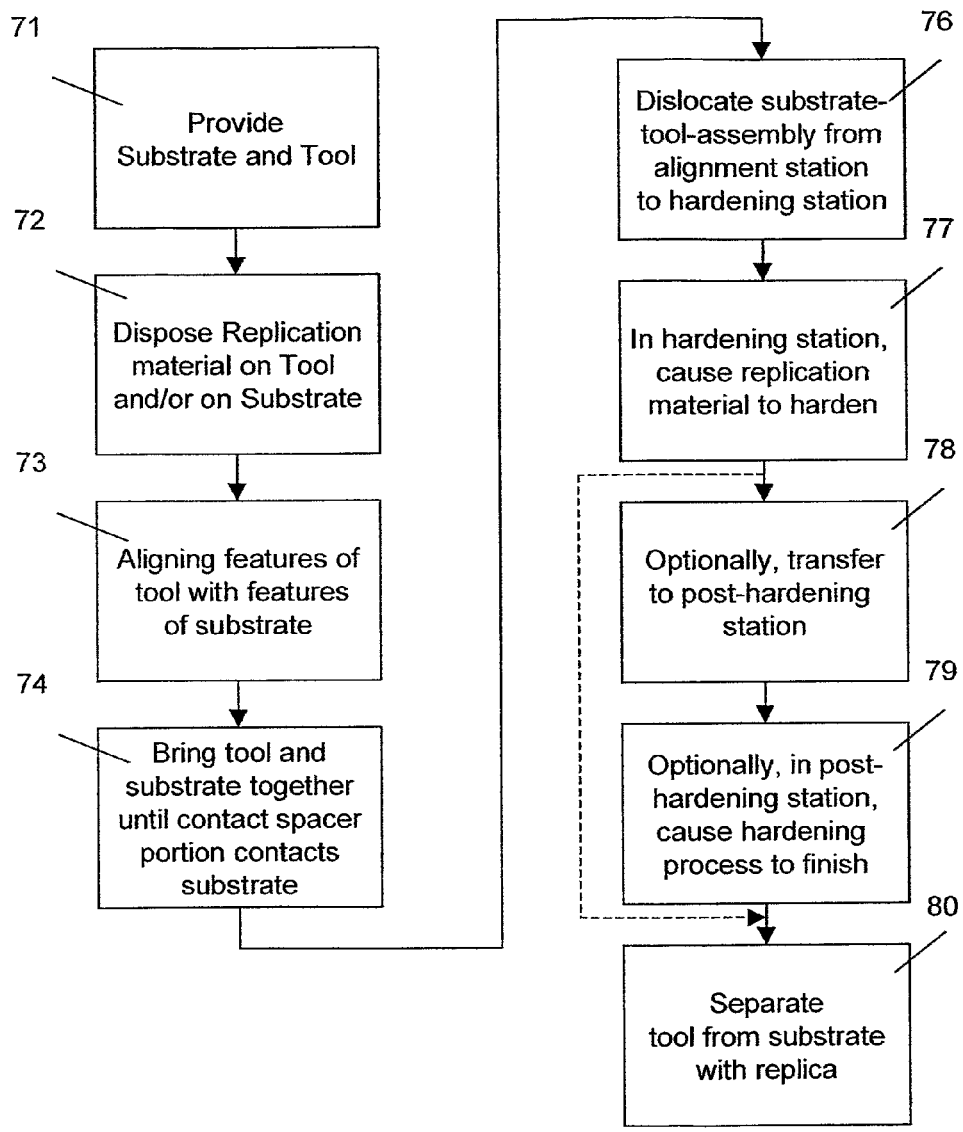
FIG. 7 a flowchart illustrating method steps of a method of manufacturing a plurality of optical elements.

FIG. 7 depicts a flowchart illustrating method steps of an example of the method according to the invention. The figure does not depict the (optional) prior replication step.

The depicted method includes the steps of providing a substrate and a replication tool (71); disposing replication material on the replication tool and/or on the substrate (72), aligning features of the tool and features of the substrate (73), bringing the tool and the substrate together until contact spacer portions contact the substrate (74), dislocating the resulting assembly from the alignment station to the hardening station (76); Causing the replication material to harden (77); an optional transfer to a post hardening station (78); an optional post-hardening step (79); and the step of separating the tool from the substrate (80).

The post hardening step 79 may include a—possibly temperature controlled—finishing of the curing of the replication material. Often, after the impinging of energy (such as UV radiation), the replication material is pre-conditioned to completely harden, but it is not yet entirely hard. Rather, it takes some further time (for example 1-60 minutes) until the material is fully hardened. The post hardening step may therefore merely include a waiting step, possibly with a temperature control of the assembly.

What is claimed is:

1. A method of manufacturing a plurality of optical elements comprising the steps of:

providing a substrate, said substrate having a first and a second side;

providing a tool comprising, on a replication side, a plurality of replication sections, each replication section defining a surface structure of one of the optical elements, the tool further comprising at least one contact spacer portion, the contact spacer portion protruding, on the replication side, further than an outermost feature of the replication sections;

aligning the tool and the substrate with respect to each other and bringing the tool and the first side of the substrate together, with liquid replication material between the tool and the substrate, the contact spacer portion contacting the first side of the substrate, and thereby causing the contact spacer portion to adhere to the first side of the substrate, thereby producing a substrate-tool-assembly, the contact spacer portion acting as a suction base and locking the relative position of the tool and the substrate;

dislocating the substrate-tool-assembly to a hardening station, wherein the dislocating is carried out without providing, after aligning the tool and the substrate with respect to each other, an energy input for increasing dimensional stiffness of the liquid replication material;

causing the replication material to harden at the hardening station; and separating the tool from the substrate with the hardened replication material adhering to the substrate.

2. The method of claim 1, wherein the step of causing the replication material to harden includes irradiating the replication material with electromagnetic radiation and thereby causing it to cross-link.

3. The method of claim 1, wherein the substrate is chosen to be at least partially transparent, and wherein, prior to the step of aligning the tool and the substrate, a hardened replication material structure adheres to the second side of the substrate, the hardened replication material structure defining a plurality of optical lens structures.

4. The method of claim 3, wherein the step of aligning the tool and the substrate includes aligning a feature of the tool to a feature of the substrate, wherein said feature is chosen to be a feature of said hardened replication material structure.

5. The method of claim 3, wherein the step of providing a substrate includes adding the hardened replication material to the substrate by the following sub-steps:
   providing a base element;
   providing a further tool comprising, on a replication side, a plurality of replication sections, each replication section defining a surface structure of one of the optical elements;
   moving the further tool and the base element towards each other, with replication material between the tool and the base element until the replication material is in contact with both, the base element and the further tool;
   causing the replication material to harden, thereby producing the hardened replication material structure; and
   separating the further tool from the base element with the hardened replication material structure adhering to the base element.

6. The method according to claim 5, wherein the further tool comprises at least one contact spacer portion, the contact spacer portion of the further tool protruding, on the replication side, further than an outermost feature of the replication sections and wherein after the step of moving the further tool and the base element towards each other and prior to causing the replication material to harden, a base-element-further-tool-assembly is dislocated from a further tool placing station to a hardening station.

7. The method of claim 6, wherein the step of causing the replication material to harden includes irradiating the replication material with electromagnetic radiation and thereby causing it to cross-link.

8. The method of claim 5, wherein the further tool comprises an alignment mark replication section for providing a replication material alignment mark on the base element.

9. The method of claim 1, wherein, prior to the step of aligning the tool with a feature of the substrate, the tool and the substrate are placed in an alignment station, and wherein the step of aligning the tool with the substrate is carried out by means of the alignment station.

10. The method of claim 1, comprising, after the step of separating the tool from the substrate, a step of dividing the substrate into a plurality of pieces, each piece together with replicated material adhering to it defining an optical element.

11. The method of claim 10, wherein after the step of separating the tool from the substrate and prior to dividing the substrate into a plurality of pieces, the substrate is assembled with other substrates to form a stack of substrates, and wherein the step of dividing the substrate into a plurality of pieces includes dividing the stack of substrates into a plurality of substrate stack pieces, each substrate stack piece constituting an optical assembly.

12. The method of claim 1, wherein the tool is chosen to comprise a back plate of a first material and a replication portion of a second material, the second material being softer than the first material.

13. The method of claim 12, wherein the second material is PDMS.

14. The method of claim 12, wherein the first material is glass.

15. The method of claim 1, wherein the hardened replication material adhering to the substrate at least partially constitutes the plurality of optical elements.

16. The method of claim 1, wherein the dislocating is carried out without previously providing energy input for increasing dimensional stiffness of the replication material.

17. The method of claim 1, wherein the liquid replication material does not provide, prior to hardening, any dimensional stiffness.

18. The method of claim 1, wherein the optical elements are refractive optical elements.

19. The method of claim 1, wherein the optical elements are refractive lenses.

20. The method of claim 1, wherein the tool further comprises spill cavities on the replication side for accepting surplus amounts of replication material.

21. A method of manufacturing a plurality of optical elements, comprising the steps of:
   providing an at least partially transparent base element, said base element having a first and a second side;
   providing a first replication tool, the first replication tool on a replication side comprising a plurality of replication sections, each replication section defining a surface structure of one of the optical elements, the first replication tool further comprising an alignment mark replication section and at least one contact spacer portion, the contact spacer portion protruding, on the replication side, further than an outermost feature of the replication sections;
   moving the first replication tool and the base element against each other with liquid replication material between them until the liquid replication material is in contact with both, the second side of the base element and the replication tool and the contact spacer portion is in contact with the second side of the base element, and thereby causing the contact spacer portion to adhere to the second side of the base element, thereby producing a substrate-tool assembly, the contact spacer portion acting as a suction base and locking the relative position of the tool and the substrate;
   dislocating the substrate-tool-assembly to a hardening station, wherein dislocating is carried out without providing, after aligning the tool and the substrate with respect to each other, an energy input for increasing dimensional stiffness of the liquid replication material;
   hardening the liquid replication material to yield a replicated structure adhering to the second surface of the base element, the replicated structure including a plurality of optical elements and at least one alignment mark, the alignment mark being a replica of the alignment mark replication section;
   removing the first replication tool;
   providing a second replication tool and aligning a feature of the second replication tool with the alignment mark with further liquid replication material between the second replication tool and the first side of the base element;
   moving the second replication tool and the base element against each other with the further liquid replication material between them until the further liquid replication material is in contact with both the first side of the base element and the replication tool;

hardening the further liquid replication material to yield a further replicated structure adhering to the first side of the base element; and removing the second replication tool.

* * * * *